United States Patent

Sandstrom et al.

[11] Patent Number: 5,997,673
[45] Date of Patent: Dec. 7, 1999

[54] TIRE TREAD COMPOUNDS COMPRISING PARTIALLY CROSSLINKED NATURAL RUBBER

[75] Inventors: Paul Harry Sandstrom, Tallmadge; Samson Samuel Apticar, Uniontown; William Paul Francik, Bath; David Allan Kindry, Clinton; Jerry Lawrence Brenner, Copley; Kevin James Pyle, Uniontown, all of Ohio

[73] Assignee: The Goodyear Tire & Rubber Company, Akron, Ohio

[21] Appl. No.: 08/923,545

[22] Filed: Sep. 4, 1997

[51] Int. Cl.⁶ .......................... B29D 30/06; B29D 30/52; B60C 9/00; B60C 11/00
[52] U.S. Cl. ..................... 156/110.1; 152/209.6; 152/537; 152/547; 156/123; 156/128.6
[58] Field of Search .............................. 152/209.5, 209.6, 152/905, 451, 537, 547, 564; 156/110.1, 128.1, 128.6, 123; 264/501, 315

[56] References Cited

U.S. PATENT DOCUMENTS

| | | | |
|---|---|---|---|
| 3,157,218 | 11/1964 | Brown | 152/330 |
| 4,064,922 | 12/1977 | Farber et al. | |
| 4,176,702 | 12/1979 | Seiberling | |
| 4,230,649 | 10/1980 | Bohm et al. | |
| 4,510,291 | 4/1985 | Kawakami | 525/237 |
| 4,818,601 | 4/1989 | Itoh et al. | 428/297 |
| 5,174,838 | 12/1992 | Sandstrom et al. | 152/209 R |
| 5,284,195 | 2/1994 | Sandstrom et al. | 152/209 R |

FOREIGN PATENT DOCUMENTS

| | | |
|---|---|---|
| 341187 | 11/1989 | European Pat. Off. . |
| 0475222 | 3/1992 | European Pat. Off. ...... C08K 5/3415 |
| 0767201 | 4/1997 | European Pat. Off. .......... C08K 3/30 |
| 55-145744 | 11/1980 | Japan . |

OTHER PUBLICATIONS

Blow, *Rubber Technology and Manufacture*, pp. 32–36, 73–83, 1971.

The Vanderbilt Rubber Handbook, Thirteenth Edition, published by R.T. Vanderbilt Company, Inc. Chapter titled "Natural Rubber" by A. Subraniam, pp. 23–43, 1990.

*Primary Examiner*—Steven D. Maki
*Attorney, Agent, or Firm*—Henry C. Young, Jr.; Alfred D. Labo

[57] ABSTRACT

In a tire having a tread with cap/base construction, a regulated amount of partially crosslinked natural rubber in a tire tread compound increases the uncured ("green") stiffness, tensile strength and tear resistance of a green compound used for the base without adversely affecting physical properties of the tread after it is cured. Such green stiffness is particularly useful in the construction of a tread for a pneumatic tire, which tread is of cap/base construction because stiffness provides requisite dimensional stability of both cap and base (in the tread) during the curing of the tire. The amount of partially crosslinked natural rubber used in a tread compound depends upon the extent of crosslinking in the natural rubber, the non-crosslinked remainder being virgin latex.

18 Claims, 2 Drawing Sheets ically pre# TIRE TREAD COMPOUNDS COMPRISING PARTIALLY CROSSLINKED NATURAL RUBBER

FIELD

This invention relates to a pneumatic rubber tire having a rubber tread of a cap/base construction. More specifically, the invention relates to a tire in which the ply coat, wire coat and tread base, are formed from a compound containing a partially crosslinked natural rubber ("NR").

BACKGROUND

State of the art pneumatic rubber tires are typically prepared with a rubber tread having a cap/base construction. In such construction the "cap" refers to the outer portion of the tread having a pattern of grooves (or "valleys") and lugs ("raised portions defining the valleys") which together impart desirable characteristics to a rolling tire as the lugs contact the ground. A primary purpose for dividing a tread into "cap" and "base" portions is to reduce the tire's rolling resistance relative to that of a tire having the same tread except that it is prepared from a single rubber compound, and to do so without unduly sacrificing its traction (skid resistance) or tread wear.

The cap preferably extends inwardly to just beneath the bottoms of the grooves. Rubber for the cap ("cap compound") is compounded to provide good skid resistance, tread wear and rolling resistance.

The base lies beneath and contiguous to the cap, thus being sandwiched between the cap and outermost belt of the tire's carcass. Rubber for the base ("base compound") is compounded to enhance rolling resistance and durability of the tire. Such constructions and different rubber compounds in the formulation of the cap and base, are disclosed in U.S. Pat. No. 3,157,218 to Brown; and U.S. Pat. Nos. 5,174,838 and 5,284,195 to Sandstrom et al.

In the art of tire construction, it is deemed that increasing the base's thickness (gauge) provides an improvement in rolling resistance (lowered resistance to rolling the tire, usually under loaded conditions) relative to a thinner base formed of the same compound. However, increasing the thickness of the base tends to produce "peaking" of the base during the molding and curing of the tire. "Peaking" refers to protrusion of base compound into the lower portion of the cap, including its lugs, which cap is formed from a cap compound different from that used to form the base. Peaking is conducive to undue wear of the lugs and the development and propagation of cracks in the cap. In extreme cases of peaking, when the lugs are worn so far as to expose the base rubber compound, the original traction and tread wear of the cap are severely compromised.

Peaking is attributed mainly to the viscosity of uncured base compound being substantially lower than that of the cap compound. Therefore, during curing of the tire at elevated temperature and under pressure, because the base compound tends to flow more easily than the cap compound, base compound seeks to protrude into the lugs and grooves as the cap is formed in a mold.

To minimize unacceptable protrusion (and peaking) it is known that it is desirable to increase the green strength and viscosity of the uncured base compound while maintaining a satisfactory resilience (rebound value) of the cured base compound. In the art, the viscosity of uncured base rubber compound has been increased with conventional compounding ingredients, such as, for example, carbon black content; and, optionally, reducing the oil content of the base compound. However, it is also conceded in the art that such expedients for increasing viscosity tend to increase the hysteresis of the cured base compound resulting in poorer rolling resistance, and otherwise compromise the desirable properties inculcated by a choice base compound. In the '838 patent and other prior art treads of similar construction, the Mooney viscosity of the uncured base rubber compound of choice is lower than that of the uncured cap compound.

The '838 patent specifically teaches the use of "high" trans 1,4-polybutadiene (so-termed because its "trans" content is at least 70%) for a base compound; and the use of trans 1,4-polybutadiene has been disclosed for various purposes, including tire tread rubber compounds and increasing green strength of rubber mixtures in Japanese Patent Publications Nos. 60-133,036: 62-101,504 and 61-143,453 and U.S. Pat. No. 4,510,291. All failed to realize that improving green strength was a good criterion for choice of a base compound only if the green strength was maintained in the higher portion of the range of normal processing temperatures, specifically at a temperature of at least 100° C. Further, the prior art failed to disclose that the critical criteria for desirable green strength was the stress/strain values of the uncured compound at 100° C., as for example, measured by the Monsanto RPA Test, which permits processing of the ingredients at a temperature in the range from about 100° C. to about 190° C.

In the '838 and '195 patents a desirable difference in flow properties of the cap and base compounds was obtained by using specified amounts of trans 1,4-polybutadiene or trans 1,4-polyisoprene. Each is substantially crystalline, and curing the tire requires conversion of each into a satisfactory rubber which is homogeneously distributed within the cured base compound. In this invention, partially crosslinked NR having minimal crystallinity is substituted for the crystalline rubbers previously used, thus avoiding the mechanism for homologating the latter. Further, crystalline rubbers are more sensitive to elevated temperatures such as are generated in a non-productive stage of compounding, resulting in less flexibility and less latitude for processing discrepancies.

The base rubber compound used to build a tire of this invention may also be used to compound a 'ply coat' and a 'wire coat'. Conventional compounds for the ply coat and the wire coat are predominantly NR and are, therefore, prone to flow excessively during cure, resulting in displacement of the wires in the belts, or in the cords of fabric, or in distortion of the circumferential profile of the inner liner compound. Typical recipes for a wire coat and a ply coat are found in *The Vanderbilt Rubber Handbook*, Thirteenth Edition pg 606, Table 7 (published by R. T. Vanderbilt Company Inc. 1990). It is highly desirable that the flow of the wire coat and ply coat compounds be more controlled and limited than it is with conventionally used NR blended with less than 30 phr (parts per hundred parts rubber by weight) cis 1,4-polybutadiene, and that such controlled flow be obtained without adversely affecting the desirable properties of the wire coat and ply coat.

Partially crosslinked natural rubbers are conventionally used as processing aids for improving the extrusion, calendering and general processing properties of natural and synthetic rubbers. In particular, partially crosslinked natural rubbers have been used in the formulation of compounds for rubber hose and rubber conveyor belts. There has been no suggestion that any of these rubbers be used to modify the viscosity of a cap or base compound specifically to affect the Mooney (ML1+4) value at 100° C., and no reason to expect that such change in value might provide the basis for controlling peaking during the cure of a tread having cap/base construction, without adversely affecting the desirable physical properties of the cured tire.

Despite the relatively low glass transition temperature Tg of the specified partially crosslinked NR which Tg might be expected to lower the Mooney viscosity of the base compound at elevated processing temperatures, the (ML1+4) viscosity at 100° C. of the novel base compound remains in the range from 50 to 60, thus allowing a processing temperature in the range from about 100° C. to 180° C. This range of processing temperature, in at least one non-productive and one productive stage, allows optimum compounding of the base compound though this range is higher than that generally deemed desirable to process prior art base compounds.

SUMMARY OF THE INVENTION

It has been discovered that a rubber tire may be produced by formulating one of its components selected from the group consisting of a ply coat, a wire coat, and a rubber tread of a cap/base construction, from a composition comprising, based on 100 parts by weight rubber (phr), (A) about 50 to about 95 parts by weight of at least one diene rubber selected from natural and/or synthetic cis 1,4-polyisoprene rubber, cis 1,4-polybutadiene rubber, styrene/butadiene copolymer rubber, styrene/isoprene/butadiene terpolymer rubber and 3,4-polyisoprene rubber; and (B) about 5 to about 50 parts by weight of a partially crosslinked natural rubber wherein the percent crosslinked is sufficient to provide from about 2% to about 12% crosslinking of the total rubber present in the composition.

It is, therefore, a general object of this invention to provide a tire having a ply coat, or a wire coat, or a sulfur-curable rubber tread of a cap/base construction, as an essential component having the composition comprising (A) and (B) defined above, based on 100 phr.

It is a specific object to provide a tire with a sulfur cured rubber tread composition for its tread which is of cap/base construction, wherein the cap compound is conventional but the base compound, and optionally the wire coat and ply coat, is each comprised of (A) and (B) defined above, based on 100 phr.

More specifically, a pneumatic rubber tire having a tread of cap/base construction wherein the base compound is formulated with a regulated, minor proportion by weight (relative to the natural rubber "NR" content thereof) of partially crosslinked natural rubber which is not more than 50% crosslinked, and does not contribute more than about 12% crosslinking in the total rubber present, allows processing at a temperature in the range from about 100° C. to about 180° C. yet provides uncured strain (G') at 100° C. higher than that contributed by trans 1,4-polybutadiene, and desirable tear resistance, but minimizes peaking in the cured tire without adversely affecting its rolling resistance, skid resistance or hysteresis.

It is a specific object of this invention to provide a tire with a sulfur cured rubber tread composition for its tread which is of cap/base construction, wherein the cap compound is conventional but the base compound, and optionally the wire coat and ply coat, is each comprised of, based on 100 phr, (A) about 65 to about 90 parts by weight of at least one diene rubber selected from the group consisting of natural and/or synthetic cis 1,4-polyisoprene rubber, cis 1,4-polybutadiene rubber, styrene/butadiene copolymer rubber, styrene/isoprene/butadiene terpolymer rubber and 3,4-polyisoprene rubber; and (B) about 10 to about 35 parts by weight, of a partially crosslinked NR wherein the percent crosslinked is sufficient to provide from about 5% to about 10% crosslinking in the natural rubber present in the composition.

It is another specific object of this invention to provide the aforesaid tread of cap/base construction, comprising (A) and (B) defined above, wherein the Mooney (ML1+4) value at 100° C. of the uncured compounded base rubber composition is at least 10 units higher than such value for the tire's uncured compounded cap rubber composition.

BRIEF DESCRIPTION OF THE DRAWING

The foregoing and additional objects and advantages of the invention will best be understood by reference to the following detailed description, accompanied with schematic illustrations of a preferred embodiment of the invention as well as an embodiment in which the protrusion of base compound in the molded tread is unsatisfactory, in which illustrations like reference numerals refer to like elements, and in which.

DETAILED DESCRIPTION OF PREFERRED EMBODIMENTS

Figure 1:
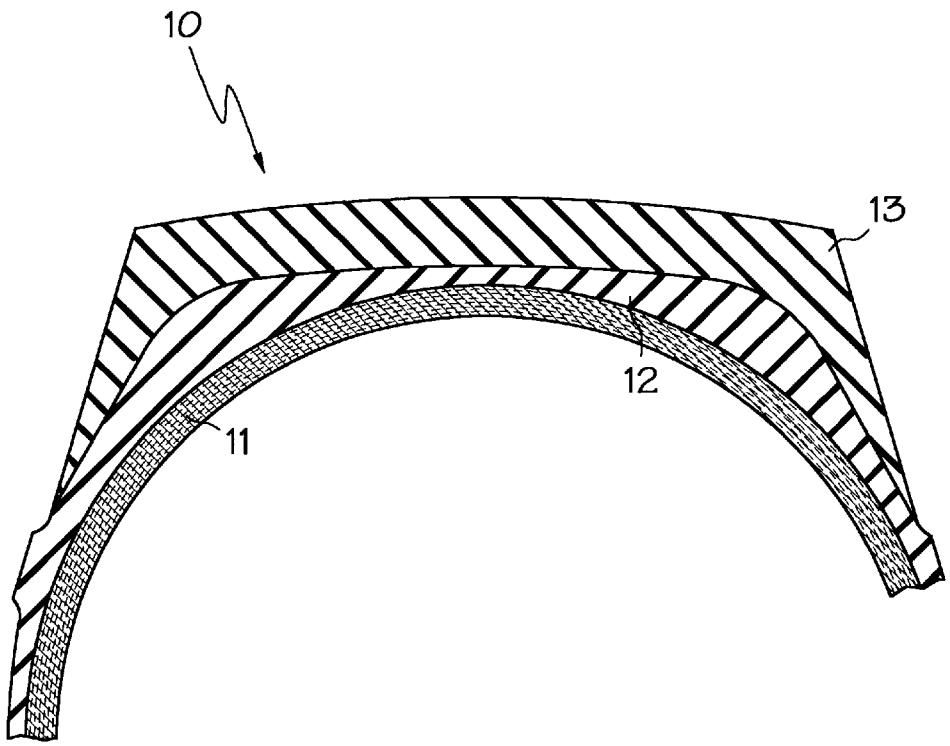
FIG. 1 is a schematic illustration, not to scale, of a cross-sectional view of a green tire having a rubber tread of a cap/base construction.

Referring to FIG. 1, there is schematically illustrated a green tire referred to generally by reference numeral 10, of conventional cap/base construction in which the tire's carcass 11 is covered with a base portion 12 which in turn is covered with a cap portion 13 before the green tire is placed in a curing mold. The profiles of the base and cap portions are determined by a die in an extruder and each profile is generally linear above the crown of the carcass. The carcass 11 includes a belt package (not separately shown in this illustration), preferably at least two annular plies of parallel cords, woven or unwoven, underlying the tread in the crown portion thereof.

Figure 2:
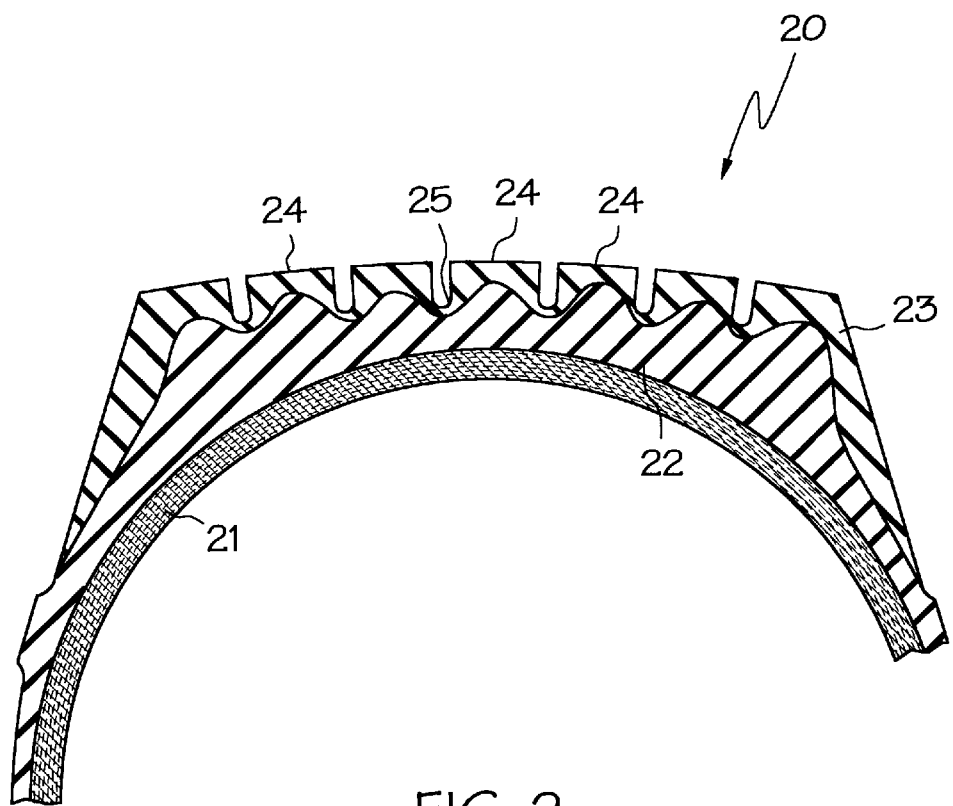
FIG. 2 is a cross-sectional view of a molded tire wherein the base compound is of a prior art composition which after molding in a conventional curing press, protrudes undesirably into the molded tread of the cured tire and has cured physical properties which do not compensate adequately for such undesirable protrusion.

After a green tire 10 which has its base compound formulated with an unsatisfactory composition, is cured and removed from the curing mold as a cured tire, a cross-section of which is schematically illustrated in FIG. 2, the cured tire referred to generally by reference numeral 20 has its carcass 21 capped with a cap portion 23 molded to forcibly conform to a desirable tread configuration including lugs 24 for contacting the road, and valleys 25 separating adjacent lugs, the configuration being determined by the mating sections of a mold. During the period the green cap/base combination is heated under pressure in the mold, base compound in base 22 attempts to follow the cap compound. In the case of a base compound which has undesirably high flow characteristics, the profile of the base compound under the substantially horizontal profiles of the lugs 24, and under the valleys 25 of the cured tread 23 are too near to the road-contacting surfaces of the lugs, and to the troughs of the valleys.

Figure 3:
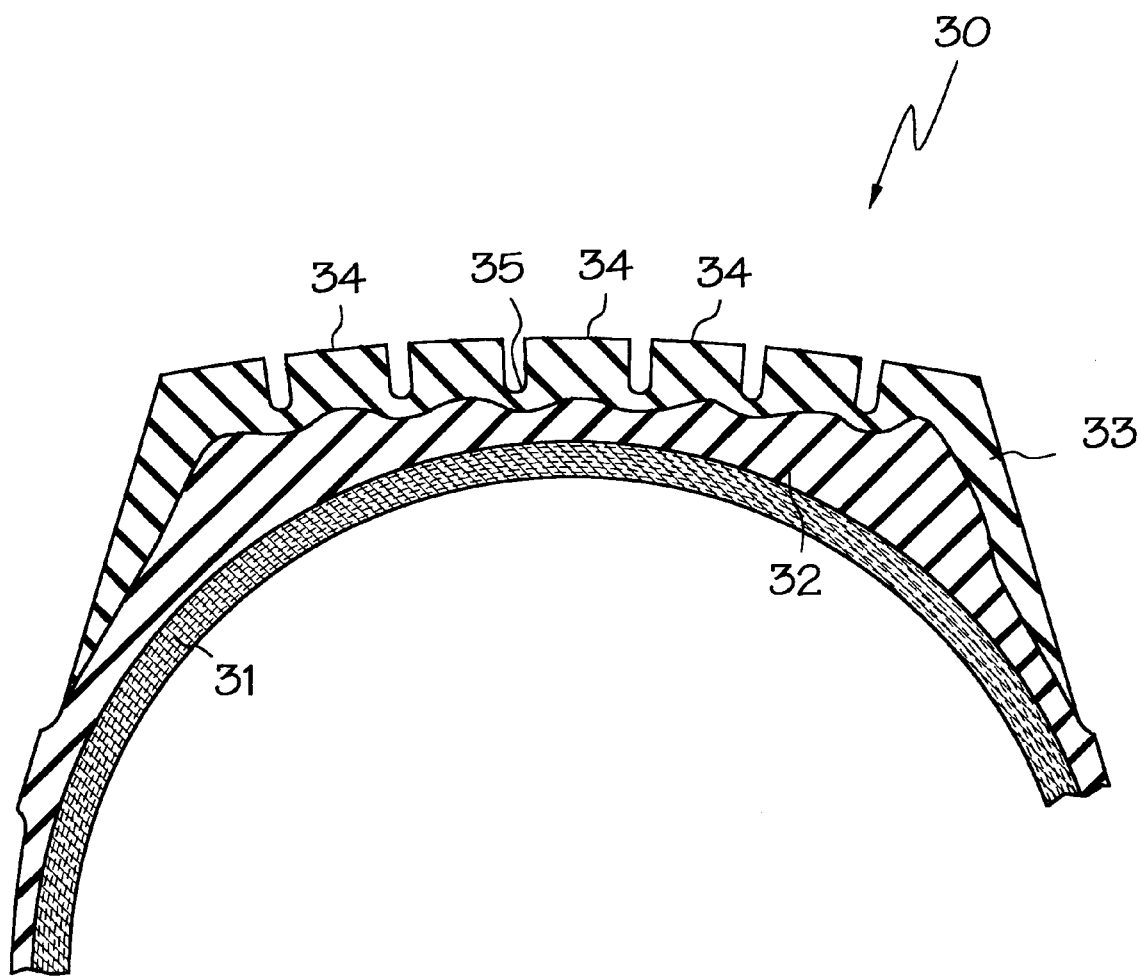
FIG. 3 is a cross-sectional view of a molded tire wherein the base compound is of the composition taught herein, and which base compound after molding, protrudes substantially less into the molded tread of the cured tire than does the base illustrated in FIG. 2, and to the extent that such protrusion is undesirable, the cured base compound has physical properties which adequately compensate for the protrusion.

In contrast, when a composition taught in this invention is used to produce a green tire 10, which is cured and removed from the curing mold as a cured tire, the cured tire referred to generally by reference numeral 30 in FIG. 3, has its carcass 31 capped with a cap portion 33 including lugs 34 and valleys 35 separating adjacent lugs. Unlike the illustration in FIG. 2, when the base compound in base 32 attempts to follow the cap compound, the result is a profile of the base compound which profile is spaced apart from the troughs of the valleys 35 relatively further away than in the profile illustrated in FIG. 2. Moreover, the physical characteristics of the base compound herein result in better performance characteristics than those obtained with a prior art composition.

In a particular embodiment of the invention it is preferred that the Mooney (ML1+4) value at 100° C. of the uncured compounded rubber base composition be at least 10 units higher, preferably from about 10 to about 40 units higher than such value for the uncured compounded cap rubber composition. Thus, for example, the Mooney (ML1+4) value for the cap compound may be in the range from about 30 to about 60 and for the base compound may be in the range from about 40 to about 100. For the purposes of this description, the "base compound" and "cap compound" refer to the respective rubber compositions which have been compounded with appropriate compounding ingredients such as, for example, carbon black, oil, stearic acid, zinc oxide, silica, wax, antidegradants, resin(s), sulfur and accelerator(s).

The thickness of the base portion 12 is typically in the range from about 0.6 mm (≈0.025") to about 2 mm (≈0.075") for a passenger tire to be used on a rim having a diameter in the range from about 33.02 cm (13") to about 43.18 cm (17") (referred to as a "conventional passenger wheel rim"). The thickness of the cap portion 13 is typically in the range from about 6 mm (≈0.25") to about 18 mm (≈0.75") for a tire for use on a conventional passenger wheel rim. Truck tires typically have greater cap thicknesses than passenger tires and the base thickness of such truck tires is correspondingly greater than they are in a passenger tire. The range of thicknesses in which the ply coat, wire coat, and tread base are formulated with the compound taught herein is essentially the same as the range conventionally used, but the addition of the aforesaid partially crosslinked NR has been observed to enable the use of a 50 percent increase in gauge (thickness) of a tread base, while reducing the gauge of the tread cap by a corresponding amount and, thus, retaining the overall thickness of the cap/base construction, without increasing base peaking in the tread cap/base combination. This would be anticipated to reduce the hysteresis of the cap/base composite and result in improving rolling resistance.

Such phenomenon uniquely suggests the preparation of an improved tire tread by enabling the use of a tread cap with high traction and/or treadwear properties yet with a thick tread base, such as one deemed desirable in the '838 and '195 patents, without appreciably sacrificing rolling resistance.

Thus, a further aspect of this invention is directed to a method of preparing a pneumatic rubber tire with a tread of cap/base construction which comprises shaping and curing an uncured pneumatic rubber tire in a mold by pressing an uncured tire outwardly against a mold surface under conditions of heat and pressure to cause at least the tread rubber of the tire to flow and cure against said mold surface, the improvement which comprises providing, for the tread base, the base rubber of this invention.

The preferred partially crosslinked NR used herein is commercially available as Superior Processing Rubbers ("SP rubbers") from Malaysia Rubber Co. with different percentages of crosslinking in various blends. Each blend is an intimate mixture of vulcanized and unvulcanized rubbers prepared by blending prevulcanized latex with normal field latex before coagulation. In blends identified as SP 20, SP 40, and SP 50, the "SP" refers to Superior Processing, and the numerals refer to the percent crosslinking, the remainder being virgin latex. Another blend identified as PA 80 contains 80 parts of the vulcanized phase; and still another, PA 57, is similar to PA 80 but also contains 40 parts by weight of a non-staining process oil. Neither PA 80 nor PA 57 is a satisfactory substitute for the SP rubbers.

The novel tire is constructed with a conventional cap rubber composition for the cap, but the base, and preferably also the ply coat and wire coat, are formulated as a rubber composition containing less than 15% crosslinked NR. The cap compound comprises at least one rubber selected from the group consisting of cis 1,4-polyisoprene rubber, 3,4-polyisoprene rubber, styrene/butadiene copolymer rubbers, styrene/isoprene/butadiene terpolymer rubbers, and cis 1,4-polybutadiene rubber. Preferably the cap is comprised of NR, or a combination of NR and cis 1,4-polyisoprene rubber and/or cis 1,4-polybutadiene rubbers. Illustrative formulations for the base compound, ply coat and wire coat compounds are provided below. The ply coat of a fabric layer is the layer of unvulcanized rubbery material which is applied to fabric prior to its being cut to its desired shape and applied to the tire on the tire building drum. The wire coat compound is used to produce a reinforcing member, for example, to coat the beads of a carcass; or, to produce a layer, for example a belt, most preferably one which is reinforced with wire. Such wire-reinforced belts unattached to the beads, having both left and right cord angles in the range from 17° to 27° with the equatorial plane of the tire, are used to form the carcass. Neither the ply coat nor the wire coat is illustrated in the drawing as the manner in which they are utilized in a tire's carcass, and their function, are well known to those skilled in the art. An attempt to illustrate them in the drawing herein would be more confusing than enlightening.

It is readily understood by those having skill in the art that the rubber compositions of the cap and base rubbers, as well as the ply coat and wire coats, would be compounded by methods generally known in the rubber compounding art, such as mixing the various sulfur-vulcanizable constituent rubbers with various commonly used ingredients. Such ingredients include curing aids, such as sulfur, activators, retarders and accelerators, processing additives such as oils, resins including tackifying resins, silicas, and plasticizers, fillers, pigments, fatty acid, zinc oxide, waxes, antioxidants and antiozonants, peptizing agents and reinforcing ingredients, most commonly carbon black. As known to those skilled in the art, depending on the intended use of the sulfur vulcanizable and sulfur vulcanized material (rubbers), additives mentioned above are selected and used in conventional amounts. A representative list of additives, as well as the range of the amount used, given in phr of diene rubber, is provided below:

Carbon black—from about 20 phr to 60 phr.

Tackifier resins—0.5 phr to about 10 phr, preferably 1 phr to 5 phr.

Processing aids—1 phr to 20 phr; such processing aids can include, for example, aromatic, naphthenic, and/or paraffinic processing oils. Silica, if used, may be used in an amount of about 5 to about 25 phr, often with a silica coupling agent. Representative silicas may be, for example, hydrated amorphous silicas.

Antioxidants—1 phr to about 5 phr. Representative antioxidants may be, for example, diphenyl-p-phenylenediamine and others, such as, for example, those disclosed in *The Vanderbilt Rubber Handbook* (1978), pages 344–346.

Antiozonants—1 phr to about 5 phr.

Fatty acids—about 0.5 to about 3 phr, most commonly stearic acid.

Zinc oxide—2 phr to about 5 phr.

Waxes—about 1 to about 5 phr. Often microcrystalline waxes are used.

Peptizers—about 0.1 to about 1 phr. Typical peptizers may be, for example, pentachlorothiophenol and dibenzamidodiphenyl disulfide.

The presence and relative amounts of the above additives are incidental to the invention which is primarily directed to the utilization of partially vulcanized NR in a sulfur vulcanizable tread base.

Vulcanization is effected by a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which is generally used in the larger amount (0.5 to 1.0 phr), and a secondary accelerator which is generally used in smaller amounts (0.05–0.50 phr) in order to activate and to improve the properties of the vulcanizate. Combinations of these accelerators have been known to produce a synergistic effect of the final properties and are generally preferred over the use of either accelerator alone. In addition, delayed action accelerators may be used which are not effected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. As with other conventional ingredients the use of a sulfur vulcanizing agent and accelerator(s) is only incidental to the tire constructed with components containing the partially crosslinked NR in the tread base, and optionally, the ply coat and wire coat.

The tire of this invention can be built, shaped, molded and cured by any desirable conventional method used by one skilled in the art. The invention may be better understood by reference to the following example in which the parts and percentages are by weight unless otherwise indicated.

In the following examples "phr" refers to parts per 100 parts of rubber, the rubber not including any other compounding ingredients; and "high" refers to a content of at least 70%.

Example I

A rubber composition particularly suited for a base compound, typically contains a major portion of NR and a minor portion of cis 1,4-polybutadiene as set forth in Table 1 below. The base compound is prepared in a BR Banbury using two separate stages of mixing, namely a non-productive stage and a productive stage of mixing. The non-productive stage was mixed for about 4 min to a drop temperature of about 160° C., whereas the productive stage was mixed for about 2 min to a drop temperature of about 120° C.

Sample 8 which is considered herein as a control, contains 75 phr natural rubber and 25 phr high cis 1,4-polybutadiene. Sample 9 which is the subject of this invention contains 35 phr natural rubber, 25 phr high cis 1,4-polybutadiene and 40 phr of SP20 partially crosslinked natural rubber. Sample 10 which is included to illustrate a comparison of crosslinked natural rubber with high trans 1,4-polybutadiene, contains 65 phr natural rubber, 25 phr high cis 1,4-polybutadiene and 10 phr high trans 1,4-polybutadiene. The level of 10 phr trans 1,4-polybutadiene is chosen because it is found to be the optimum level for use in a base compound.

The results shown in Table 2 indicate that high trans 1,4-polybutadiene provides better green strength as measured by % elongation at 23° C., than the SP 20 containing compound. However, when strain (uncured G') is measured at 100° C. by the Monsanto RPA test, the superiority of partially crosslinked natural rubber is evident. This improved strain is critical at typical processing temperatures for compounded stocks during the tire building process, the more so when the non-productive stage is mixed for a drop temperature in the range from about 120° to 180° C.; and the productive stage is mixed for a drop temperature in the range from about 100° C. to 140° C. Moreover, a comparison of minimum torque (Rheometer 150° C.) for samples 9 and 10 provides clear evidence that the novel base compound retains a higher viscosity than sample 10. These results provide evidence that compounds containing the specified amounts of partially crosslinked natural rubber possess the essential higher green strength values at the elevated temperatures currently used in the tire building and shaping process, prior to the final curing in a mold.

TABLE 1

| Sample # | 8 | 9 | 10 |
|---|---|---|---|
| Non-Productive Stage | | | |
| Natural Rubber | 75 | 35 | 65 |
| Cis 1,4-polybutadiene[1] | 25 | 25 | 25 |
| SP20 | 0 | 40 | 0 |
| Trans 1,4-polybutadiene[2] | 0 | 0 | 10 |
| Carbon Black | 30 | 30 | 30 |
| Silica | 3 | 3 | 3 |
| Processing Aids | 5 | 5 | 5 |
| Fatty Acid | 1 | 1 | 1 |
| Peptizer | 0.5 | 0.5 | 0.5 |

TABLE 1-continued

| Sample # | 8 | 9 | 10 |
|---|---|---|---|
| Productive Stage | | | |
| Zinc Oxide | 3 | 3 | 3 |
| Accelerators | 0.9 | 0.9 | 0.9 |
| Sulfur | 2.25 | 2.25 | 2.25 |

[1]BUDENE ® 1207 high cis 1,4-polybutadiene from The Goodyear Tire & Rubber Company.
[2]80% trans from The Goodyear Tire & Rubber Company.

TABLE 2

| Sample # | 8 | 9 | 10 |
|---|---|---|---|
| Natural Rubber | 75. | 55. | 35. |
| Cis 1,4-polybutadiene[1] | 25 | 25 | 25 |
| SP20 | 0 | 40 | 0 |
| Trans 1,4-polybutadiene[2] | 0 | 0 | 10 |
| Rheometer (150° C.) | | | |
| Max Torque | 40.0 | 42.8 | 42.5 |
| Min Torque | 8.0 | 9.8 | 8.3 |
| Delta Torque | 32.0 | 33.0 | 34.2 |
| $T_{90}$, minutes | 6.9 | 5.5 | 7.0 |
| Green Strength (23° C.) | | | |
| 40% Elongation, MPa | 3.5 | 4.5 | 7.2 |
| 120% Elongation, MPa | 3.7 | 5.4 | 10.2 |
| Break Strength, MPa | 8.3 | 19.5 | 20.7 |
| % Elongation @ Break | 935 | 660 | 598 |
| Monsanto RPA Test | | | |
| Uncured G' @ 100° C. | | | |
| 2% Strain, 0.33 Hz | 106 | 156 | 117 |
| 2% Strain, 3.33 Hz | 228 | 284 | 253 |
| 2% Strain, 0.83 Hz | 134 | 178 | 150 |
| 2% Strain, 8.3 Hz | 256 | 302 | 287 |
| Stress-Strain | | | |
| Tensile Strength, MPa | 15.1 | 12.5 | 12.9 |
| Elongation @ Break, % | 416 | 355 | 382 |
| 100% Modulus, MPa | 2.0 | 2.3 | 2.1 |
| 300% Modulus, MPa | 9.2 | 10.8 | 10.0 |

Example II

Rubber compositions containing the ingredients set out in Table 3 were prepared as in Example I, in a BR Banbury using a non-productive stage and a productive stage. The non-productive stage was mixed for about 4 minutes to a drop temperature of about 160° C., whereas the productive stage was mixed for about 6 minutes to a drop temperature of 120° C.

Sample 1, a conventional ply coat composition and the control herein, contains 100 phr of NR. Samples 2, 3 and 4 which contain 25, 50 and 100 phr of SP 20 crosslinked NR are the experimental ply coat compounds. The remaining compounding ingredients in each sample are identical, as are the amounts of each ingredient used.

TABLE 3

| Sample # | 1 | 2 | 3 | 4 |
|---|---|---|---|---|
| Non-Productive Stage | | | | |
| Natural Rubber[1] | 100. | 75. | 50. | 0.0 |
| Carbon Black | 30. | 30. | 30. | 30. |
| Silica[3] | 3. | 3. | 3. | 3. |
| Processing Oil | 7. | 7. | 7. | 7. |
| Fatty Acid | 1. | 1. | 1. | 1. |
| SP20[2] | 0. | 25. | 50. | 100. |
| Productive Stage | | | | |
| Zinc Oxide | 3. | 3. | 3. | 3. |
| Sulfur | 1.8 | 1.8 | 1.8 | 1.8 |
| Accelerator[4] | 1.6 | 1.6 | 1.6 | 1.6 |
| Resin | 0.75 | 0.75 | 0.75 | 0.75 |

[1]TTR20 natural rubber
[2]SP 20 (20% crosslinked) (from Malaysia)
[3]silica is Hi-Sil 210 (PPG Industries Inc.)
[4]sulfenamide type The physical properties of the foregoing samples are set forth below in Table 4 in which only the ratio of NR to SP 20 in each sample is set forth for ease of reference. The green strength and Mooney viscosity are for the uncured samples. Data for the stress-strain and succeeding properties are for samples cured for 18 min at 150° C.

TABLE 4

| Sample # | 1 | 2 | 3 | 4 |
|---|---|---|---|---|
| Natural Rubber[1] | 100. | 75. | 50. | 0.0 |
| SP20[2] | 0. | 25. | 50. | 100. |
| Green Strength | | | | |
| 40% Elongation | 3.2 | 3.9 | 4.5 | 4.5 |
| 120% Elongation | 3.4 | 4.2 | 5.4 | 5.3 |
| Break Strength | 10.4 | 12.7 | 15.5 | 21.5 |
| % Elongation @ Break | 623 | 573 | 565 | 485 |
| Mooney Viscosity ML1 + 4, 100° C. | 48 | 53 | 56 | 61 |
| Rheometer (150° C.) | | | | |
| Max Torque, dNm | 34.8 | 35.0 | 35.3 | 36.5 |
| Min Torque, dNm | 6.0 | 6.0 | 7.3 | 8.5 |
| Delta Torque, dNm | 28.8 | 29.0 | 28.0 | 28.0 |
| $T_{90}$, minutes | 10.5 | 10.8 | 10.5 | 9.5 |
| Stress-Strain | | | | |
| Tensile Strength, MPa | 21.9 | 19.3 | 19.1 | 11.4 |
| Elongation @ Break, % | 563 | 540 | 520 | 364 |
| 100% Modulus, MPa | 1.6 | 1.6 | 1.6 | 1.6 |
| 300% Modulus, MPa | 8.4 | 8.4 | 8.3 | 8.9 |
| Strebler Adhesion, 95° C. N, Tear Resistance Rebound | 71 | 65 | 51 | 47 |
| RT (20° C.), % | 76 | 76 | 75 | 74 |
| 100° C., % | 82 | 83 | 82 | 81 |
| Hardness | | | | |
| RT (20° C.), % | 48 | 49 | 49 | 50 |
| 100° C., % | 49 | 49 | 49 | 50 |

It is evident from the foregoing data, that green strength increases as the level of SP 20 is increased from 25 phr to 100 phr, and that of each sample containing SP 20 is greater than that of the control sample 1. From plotting the data for some critical properties including green strength, tensile strength and tear resistance, improvement over the control is evident at 2% crosslinking; however, at 20% crosslinking there is no significant change in the elongation at 40% and 120%, and the tear resistance and tensile are both significantly lower. From the plot it appears that about 12% crosslinking provides the desirable improvement which is thereafter denigrated by further crosslinking. With the addition of SP 20 in the above samples, it is therefore evident that tensile strength, green strength and tear resistance for this ply coat compound are optimum when between 25 phr and 50 phr of NR is replaced with SP 20, the remainder of total rubber being from 75 phr to 50 phr of NR; and that such optimum physical properties accrue without sacrificing processing flexibility.

Example III

Rubber compositions for a wire coat containing the ingredients set out in Table 5 were prepared in a BR Banbury rubber mixer using three states of mixing, namely two non-productive stages and a productive stage. Sample 5 is a conventional wire coat composition. The non-productive stages were each mixed about 4 minutes to a drop temperature of about 120° C. Sample 5, the control herein, contains 75 phr of NR, and 25 phr of synthetic cis 1,4-polyisoprene. Samples 6 and 7 which contain 20 phr and 40 phr SP 40 (40% crosslinked natural rubber) respectively, are experimentals. The remaining compounding ingredients in each sample are identical, as are the amounts of each ingredient used.

TABLE 5

| Sample # | 5 | 6 | 7 |
|---|---|---|---|
| First Non-Productive Stage | | | |
| Natural Rubber[1] | 75. | 55. | 35. |
| SP20[2] | 0. | 20. | 40 |
| Carbon Black | 25. | 25. | 25. |
| Processing Aid | 3.3 | 3.3 | 3.3 |
| Peptizer | 0.25 | 0.25 | 0.25 |
| Second Non-Productive Stage | | | |
| NAT 2200[3] | 25. | 25. | 25. |
| Carbon Black | 10. | 10. | 10. |
| Fatty Acid | 0.5 | 0.5 | 0.5 |
| Zinc Oxide | 2. | 2. | 2. |
| Antidegradant | 2. | 2. | 2. |
| Productive Stage | | | |
| Zinc Oxide | 2. | 2. | 2. |
| Antidegradant | 0.75 | 0.75 | 0.75 |
| Sulfur | 2.25 | 2.25 | 2.25 |
| Accelerator[4] | 0.9 | 0.9 | 0.9 |

[1]TRR20 natural rubber
[2]SP 40 (40% crosslinked) (from Malaysia)
[3]synthetic cis 1,4-polyisoprene (from The Goodyear Tire & Rubber)

It is evident that the foregoing data for this wire coat compound show improved green strength when using 20 phr (sample 6), or 40 phr (Sample 7) SP 40 when compared to the Sample 4 control. There is no substantial increase in uncured Mooney viscosity, or tensile of the cured samples 6 and 7, while the decrease in tear strength is substantial. From a plot of the data it is evident that the tear resistance and tensile strength are optimum in the range from below 8% to below 16% crosslinking contributed by the SP 40.

In the following Table 6 only the rubber components of each sample is set forth. As before, the green strength and Mooney viscosity are for the uncured samples; data for the stress-strain and succeeding properties are for cured samples.

TABLE 6

| Sample # | 5 | 6 | 7 |
|---|---|---|---|
| Natural Rubber[1] | 75. | 55. | 35. |
| NAT 2200[3] | 25. | 25. | 25. |
| SP 40[2] | 0. | 20. | 40. |
| Trans 1,4-polybutadiene[2] | 0 | 0 | 0 |
| Green Strength | | | |
| 40% Elongation | 2.6 | 3.6 | 3.9 |
| 120% Elongation | 2.5 | 2.5 | 2.5 |
| Break Strength | 3.5 | 3.5 | 3.5 |
| % Elongation @ Break | 1310 | 970 | 995 |
| Mooney Viscosity ML1 + 4, 100° C. | 34 | 39 | 40 |
| Rheometer (150° C.) | | | |
| Max Torque, dNm | 33.80 | 34.0 | 35.0 |
| Min Torque, dNm | 5.0 | 6.5 | 7.5 |
| Delta Torque, dNm | 28.0 | 27.5 | 27.5 |
| $T_{90}$, minutes | 9.5 | 8.0 | 6.8 |
| Stress-Strain | | | |
| Tensile Strength, MPa | 20.3 | 20.3 | 20.0 |
| Elongation @ Break, % | 563 | 568 | 545 |
| 100% Modulus, MPa | 1.5 | 1.6 | 1.8 |
| 300% Modulus, MPa | 7.9 | 8.0 | 8.8 |

From the foregoing it is evident that the crosslinking is preferably provided by SP rubbers 20, 40 and 50, higher crosslinked content providing no additional benefit, and that from about 2 to 12% partially crosslinked NR, more preferably from about 5 to 10% partially crosslinked NR, is advantageously substituted for rubber in a base compound, ply coat or wire coat, and that in such compounds, from about 50 phr to 75 phr of the total rubber content be natural rubber.

While certain representative embodiments and details have been shown for the purpose of illustrating the invention, it will be apparent to those skilled in this art that various changes and modifications may be made therein without departing from the spirit or scope of the invention.

What is claimed is:

1. A rubber tire having an uncured component selected from the group consisting of a ply coat, a wire coat, and a base of a rubber tread of a cap/base construction wherein said component has a composition comprising, based on 100 parts by weight rubber, (A) about 50 to about 95 parts by weight of at least one diene rubber selected from natural rubber, synthetic cis 1,4-polyisoprene rubber, cis 1,4-polybutadiene rubber, styrene/butadiene copolymer rubber, styrene/isoprene/butadiene terpolymer rubber and 3,4-polyisoprene rubber; and (B) about 5 to about 50 parts by weight of a partially crosslinked natural rubber wherein the percent crosslinked is sufficient to provide from about 2% to about 12% crosslinking of rubber present in said composition of said component.

2. The rubber tire of claim 1 wherein said component is a ply coat.

3. The rubber tire of claim 1 wherein said component is a wire coat.

4. The rubber tire of claim 1 wherein said component is a base of a rubber tread of a cap/base construction.

5. The rubber tire of claim 4 wherein said cap is prepared from a cap compound having a Mooney (ML1+4) viscosity at 100° C. which is at least 10 units lower than the Mooney (ML1+4) value at 100° C. for said base.

6. A method of preparing a pneumatic rubber tire having a component selected from the group consisting of a ply coat, a wire coat, and a base of a rubber tread of a cap/base construction, said method comprising shaping and curing an uncured pneumatic rubber tire in a mold by pressing said tire outwardly against a mold surface under conditions of heat and pressure to cause at least said rubber tread to flow and cure against said mold surface, the improvement comprising curing said component having a composition comprising, based on 100 parts by weight rubber, (A) about 50 to about 95 parts by weight of at least one diene rubber selected from natural rubber, synthetic cis 1,4-polyisoprene rubber, cis 1,4-polybutadiene rubber, styrene/butadiene copolymer rubber, styrene/isoprene/butadiene terpolymer rubber and 3,4-polyisoprene rubber; and (B) about 5 to about 50 parts by weight of a partially crosslinked natural rubber wherein the percent crosslinked is sufficient to provide from about 2% to about 12% crosslinking of rubber in the composition of said component.

7. The method of claim 6 wherein said component is a ply coat.

8. The method of claim 6 wherein said component is a wire coat.

9. The rubber tire of claim 6 wherein said component is a base of a rubber tread of a cap/base construction.

10. The rubber tire of claim 9 wherein said cap is prepared from a cap compound having a Mooney (ML1+4) viscosity at 100° C. which is at least 10 units lower than the Mooney (ML1+4) value at 100° C. for said base.

11. A rubber tire having an uncured rubber tread of a cap/base construction wherein rubber composition of said base is comprised of, based on 100 parts by weight rubber, (A) about 50 to about 95 parts by weight of at least one diene rubber selected from natural rubber, synthetic cis 1,4-polyisoprene rubber, cis 1,4-polybutadiene rubber, styrene/butadiene copolymer rubber, styrene/isoprene/butadiene terpolymer rubber and 3,4-polyisoprene rubber; and (B) about 5 to about 50 parts by weight of a partially crosslinked natural rubber wherein the percent crosslinked is sufficient to provide from about 2% to about 12% crosslinking of rubber in said composition of said base; whereby when the tire is cured, peaking in the cured tire is minimized without adversely affecting its rolling resistance, skid resistance or hysteresis.

12. The tire of claim 1 wherein said base rubber composition is comprised of, based on 100 parts by weight rubber, (A) about 65 to about 90 parts by weight of at least one of said diene rubbers, and (B) about 10 to about 35 parts of said partially crosslinked natural rubber, sufficient to provide from about 5% to about 10% crosslinking of said rubber in said composition of said base.

13. The tire of claim 12 wherein the Mooney (ML1+4) value at 100° C. of uncured base rubber composition is at least 10 units higher than [ such ] the Mooney (ML1+4) value at 100° C. for uncured cap rubber composition of said cap.

14. The tire of claim 13 wherein the Mooney (ML1+4) value at 100° C. for said uncured cap rubber composition is in the range of about 30 to about 60 and for said uncured base rubber composition is in the range of from about 40 to about 100.

15. A method of preparing a pneumatic rubber tire having a rubber tread of a cap/base construction said method comprising shaping and curing an uncured pneumatic rubber tire in a mold by pressing said tire outwardly against a mold surface under conditions of heat and pressure to cause at least the tread rubber of said tire to flow and cure against said mold surface, the improvement comprising curing said base having a composition comprising, based on 100 parts by weight rubber, (A) about 50 to about 95 parts by weight of at least one diene rubber selected from natural rubber, synthetic cis 1,4-polyisoprene rubber, cis 1,4-polybutadiene rubber, styrene/butadiene copolymer rubber, styrene/isoprene/butadiene terpolymer rubber and 3,4-polyisoprene rubber; and (B) about 5 to about 50 parts by weight of a partially crosslinked natural rubber wherein the percent crosslinked is sufficient to provide from about 2% to about 12% crosslinking of rubber in the composition of said base; whereby when the tire is cured, peaking in the cured tire is minimized without adversely affecting its rolling resistance, skid resistance or hysteresis.

16. The method of claim 15 in which the base rubber composition of the tread of the said pneumatic tire is comprised of, based on 100 parts by weight rubber, (A) about 65 to about 90 parts by weight of at least one of said diene rubbers, and (B) about 10 to about 35 parts of said partially crosslinked natural rubber, sufficient to provide from about 5% to about 10% crosslinking in said rubber in said composition of said base.

17. The method of claim 16 in which, for the rubber tread of said pneumatic tire, the Mooney (ML1+4) value at 100° C. of uncured base rubber composition is at least 10 units higher than the Mooney (ML1+4) value at 100° C. for uncured cap rubber composition of said cap.

18. The method of claim 17 where, for the rubber tread of the said pneumatic tire, the Mooney (ML1+4) value at 100° C. for said uncured cap rubber composition is in the range of about 30 to about 60 and for the uncured base rubber composition is in the range of from about 40 to about 100.

* * * * *